US012586397B2

(12) United States Patent (10) Patent No.: US 12,586,397 B2
Grams (45) Date of Patent: Mar. 24, 2026

(54) METHOD AND APPARATUS EMPLOYING FONT SIZE DETERMINATION FOR RESOLUTION-INDEPENDENT RENDERED TEXT FOR ELECTRONIC DOCUMENTS

(71) Applicant: KONICA MINOLTA BUSINESS SOLUTIONS U.S.A., INC., Foster City, CA (US)

(72) Inventor: Jason Grams, Westminster, CO (US)

(73) Assignee: KONICA MINOLTA BUSINESS SOLUTIONS U.S.A., INC., Foster City, CA (US)

( * ) Notice: Subject to any disclaimer, the term of this patent is extended or adjusted under 35 U.S.C. 154(b) by 335 days.

(21) Appl. No.: 18/405,490

(22) Filed: Jan. 5, 2024

(65) Prior Publication Data

US 2025/0225803 A1 Jul. 10, 2025

(51) Int. Cl.
*G06V 30/18* (2022.01)
*G06V 10/82* (2022.01)
*G06V 30/14* (2022.01)
*G06V 30/19* (2022.01)
(52) U.S. Cl.
CPC ........ *G06V 30/18086* (2022.01); *G06V 10/82* (2022.01); *G06V 30/1448* (2022.01); *G06V 30/19147* (2022.01)
(58) Field of Classification Search
None
See application file for complete search history.

(56) References Cited

U.S. PATENT DOCUMENTS

| | | | |
|---|---|---|---|
| 2006/0017752 A1 | 1/2006 | Kurzweil et al. | |
| 2015/0302598 A1 | 10/2015 | Collet et al. | |
| 2016/0088214 A1 | 3/2016 | Karttunen et al. | |
| 2018/0336444 A1 | 11/2018 | Ramasamy et al. | |
| 2019/0266443 A1* | 8/2019 | Zhang | G06V 10/82 |
| 2021/0334573 A1 | 10/2021 | Kuhlmann et al. | |
| 2023/0110114 A1* | 4/2023 | Reddy | G06T 3/40 |
| | | | 345/660 |
| 2024/0073337 A1* | 2/2024 | Harris | G06V 10/764 |

FOREIGN PATENT DOCUMENTS

| | | |
|---|---|---|
| CN | 106255979 | 12/2016 |
| DE | 199 53 610 A1 | 9/2000 |

OTHER PUBLICATIONS

Ma, H., & Doermann, D. S. (Aug. 2003). Gabor Filter Based Multi-class Classifier for Scanned Document Images. In ICDAR (vol. 3, p. 968). (Year: 2003).*

(Continued)

*Primary Examiner* — Ian L Lemieux
(74) *Attorney, Agent, or Firm* — SQUIRE PATTON BOGGS (US) LLP

(57) ABSTRACT

Method and apparatus for determining font point size in bitmapped text does not rely on accuracy of an optical character recognition (OCR) engine, or on generation of heuristics (e.g. assumption of certain amounts of different types of text, such as capital, lowercase, ascending, descending) to determine a likely font size. A deep learning model for determining text size is based on extraction of features from existing text to obtain a more general solution.

20 Claims, 4 Drawing Sheets

(56)     References Cited

OTHER PUBLICATIONS

Wang, Z., Yang, J., Jin, H., Shechtman, E., Agarwala, A., Brandt, J., & Huang, T. S. (Oct. 2015). Deepfont: Identify your font from an image. In Proceedings of the 23rd ACM international conference on Multimedia (pp. 451-459). (Year: 2015).*

Zhao, N., Cao, Y., & Lau, R. W. (Oct. 2018). Modeling fonts in context: Font prediction on web designs. In Computer Graphics Forum (vol. 37, No. 7, pp. 385-395). (Year: 2018).*

Khurana, R., Agarwal, V., Vachhani, J. R., & Bhanodai, G. (2021). FONTNET: On-Device Font Understanding and Prediction Pipeline. arXiv preprint arXiv:2103.16150. (Year: 2021).*

Fujioka, T., & Tanaka, G. (2025). Transformer-Based Vector Font Classification Using Different Font Formats: True Type versus PostScript. arXiv preprint arXiv:2502.00250. (Year: 2025).*

* cited by examiner ace          ACE

FIG. 1A ace          age

FIG. 1B ace          ade

FIG. 1C

ACE          age

FIG. 1D soufflé
señor
garçon
¿Qué?
naïve

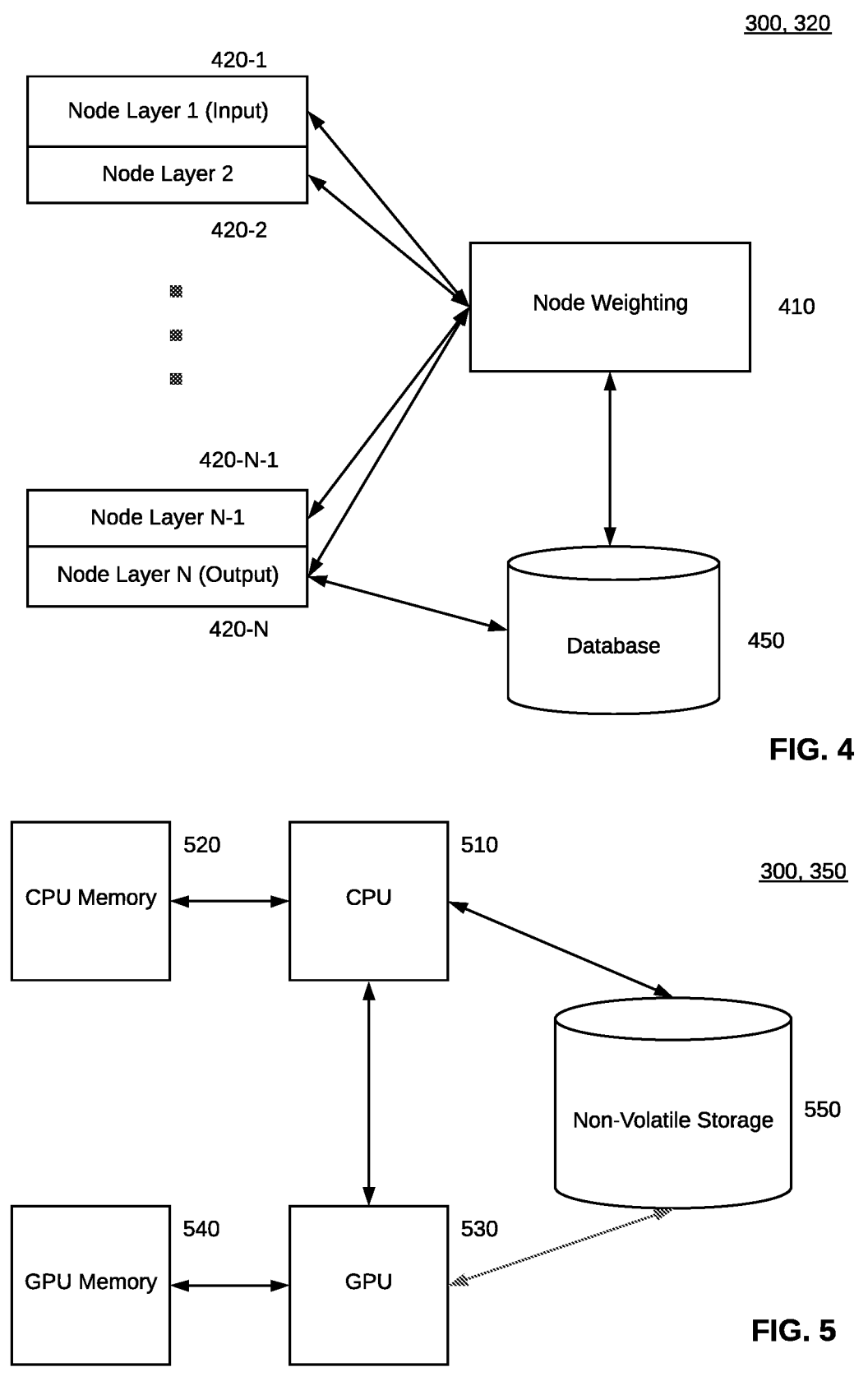

Node Layer 1 (Input)

Node Layer 2

420-2

Node Weighting     410

⠿
⠿
⠿

420-N-1

Node Layer N-1

Node Layer N (Output)

420-N

Database     450

CPU Memory

510

CPU

540

GPU Memory

530

GPU

550

Non-Volatile Storage

FIG. 5

METHOD AND APPARATUS EMPLOYING FONT SIZE DETERMINATION FOR RESOLUTION-INDEPENDENT RENDERED TEXT FOR ELECTRONIC DOCUMENTS

FIELD OF THE INVENTION

Aspects of the present invention relate to image processing, and more specifically text processing in electronic document generation. Yet more specifically, aspects of the invention relate to font point size determination for rendered lines of text in electronic document generation.

BACKGROUND OF THE INVENTION

In electronic documents, it is desirable to have text paragraphs with the same text font size. One issue in providing uniform text font size in electronic document paragraphs is uniform font point size determination, because font point size affects font size. Placing a bounding box around rendered text has been one approach to font point size determination. However, there are numerous aspects of fonts, from upper case versus lower case, to ascenders or descenders, to various kinds of accents, diacritical marks, and the like, all of which can have an effect on character appearance, and hence on font point size determination. Simply placing a bounding box around the text does not enable inference of font point size, because point size does not necessarily match directly to text height.

Figures 1A, 1B, 1C, 1D, 1E:
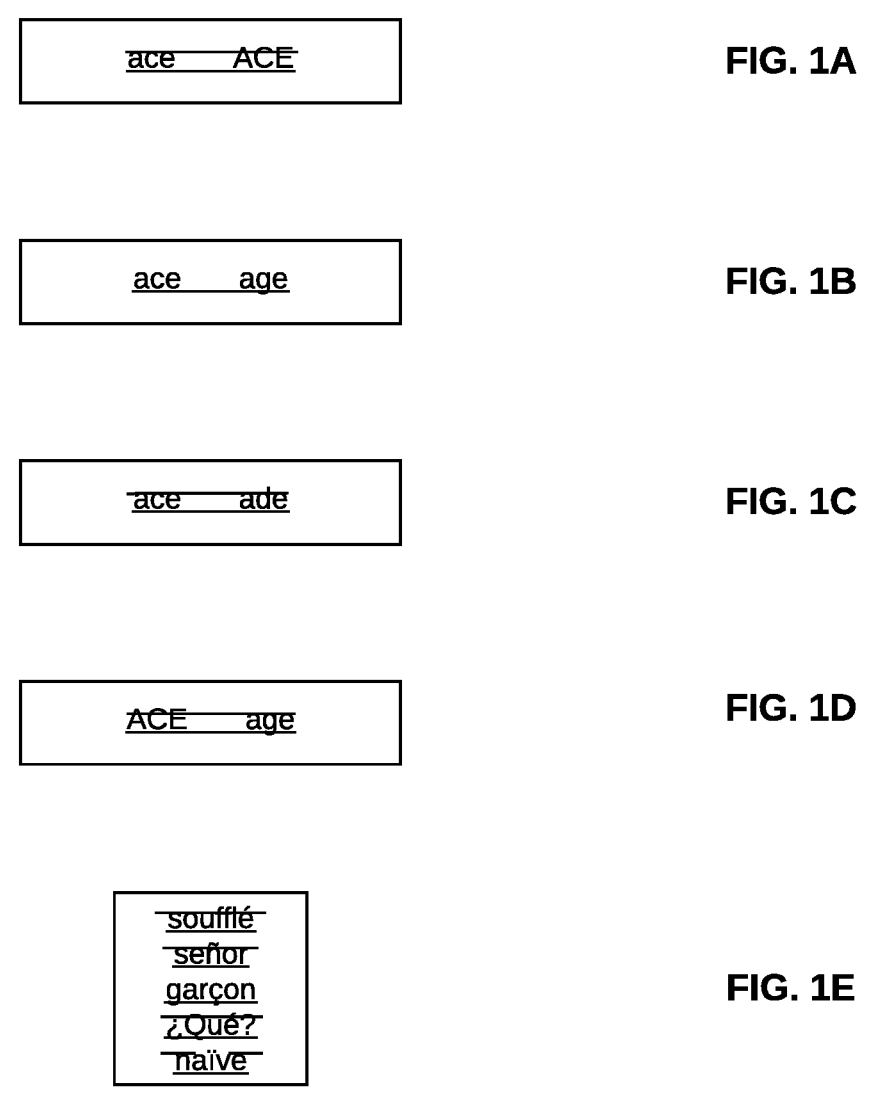

FIGS. 1A-1E show examples of different heights of characters and words in different cases and with different marks, to illustrate how point size does not necessarily imply font size or word height. In FIG. 1A, the lower case word "ace" is next to the upper case word "ACE". These are the same letters, but not in the same case, and so the resulting text heights, even for the same font size, potentially can yield different font sizes. FIG. 1B presents a different type of problem, with all lower case letters, but with a word, "age," with a descender which likewise can affect determination of font point size. FIG. 1C is like FIG. 1B, but with a word, "ade," with an ascender. FIG. 1D shows an upper case word next to a lower case word with a descender. The conditions in FIGS. 1C and 1D also can affect font point size determination.

FIG. 1E contains several examples of different kinds of words, with not only lower and upper case letter combinations, but also letters with ascenders or descenders, and letters with different accents or different diacritical marks, and different punctuation.

As ordinarily skilled artisans will appreciate from FIGS. 1A-1E, putting bounding boxes around text of different heights does not suffice to define text size for identification of point size. For example, a bounding box that may fit around "ace" will not fit around "ACE". A bounding box that fits around "ace" will not fit around "ade" or "age". A bounding box that fits around just the letters in señor, will not fit around the tilde as well.

One issue in document processing is the inability to know font type ahead of time. Different font types provide different ratios for different characters. Different variants of font types—e.g. bold, italic, narrow v wide v normal, or the like—also can provide different ratios. Trying to rely on font types and/or their variants can provide inconsistent results when trying to apply information about one font type to bitmapped text corresponding to another font type.

It would be desirable to enable point size determination without requiring optical character recognition (OCR). Further, it would be desirable to enable point size determination without some advance determination of likely font size or font type, thereby enabling point size determination independent of typeface or font.

SUMMARY OF THE INVENTION

Aspects of the invention provide a mechanism for point size determination in rendered text without requiring understanding of font metrics or details of the input text, or making any assumptions about the text being input (such as font type, bolding, italics, narrowness, or the like). Reliance on extraction of features from existing documents enables robust training of a machine learning (ML) model with automatically-generated data.

BRIEF DESCRIPTION OF THE DRAWINGS

Aspects of the present invention now will be described in detail with reference to embodiments, as depicted in the accompanying drawings, in which:

FIGS. 1A-1E show examples of letters, words, and diacritical marks to exemplify issues in point size determination;

FIG. 4 is a high level block diagram of portions of FIG. 3 according to an embodiment; and FIG. 5 is a high level block diagram of portions of FIG. 3 according to an embodiment.

DETAILED DESCRIPTION

In aspects of the present invention, efficiency and/or performance is not affected by the need to decipher different type of lines of text of different characters, e.g. all upper case letters versus all lower case letters versus all letters with descenders or all letters with ascenders, combinations of any or all of the foregoing, etc.

Embodiments of the invention employ machine learning (ML) systems which are trained on large sets of bitmapped text, all or substantially all of this bitmapped text being of known point size. The training data may be rendered at a specific resolution $R_G$ (ground truth), with text scaled to a target scale height $H_N$. In one aspect, known point size for each training input may be scaled based on a ratio of a rendered text bounding box height $H_0$ to the target scale height $H_N$. With this approach, model outputs may be scaled to this target scale height, and thus can be used independently from a target resolution. In embodiments, automatically-generated data with the indicated specific resolution and scaled text height may be used to train the system and thus promote identification of font size in processed bitmapped text. Such identification facilitates generation of electronic documents in word processing software such as Microsoft's Office 365™, Google's G Suite™, Apache OpenOffice, LibreOffice, and the like.

One desired effect of aspects of the invention is to provide consistent font size in electronic documents. For example, font size may be tailored for an electronic document on standard letter sized paper (8.5"×11"), with standard margins (1" all around). 12 point fonts may be considered to be most common. Accordingly, a desired target point size to achieve the desired font size may be desirable.

In embodiments, the automatically-generated data to train an ML system may come from various types of transforms of bitmapped text. Gabor filters are one example of a class of such transforms. Various parameters in Gabor filters may be altered to yield different transforms. Altering one or more of these parameters may facilitate automatic generation of training data for the ML system.

One ML system category is known as Gabor Convolutional Networks (GCN or GCNN), which may incorporate Gabor filters into deep convolutional neural networks (DCNN). In different aspects, Gabor filters may be employed with various deep learning architectures. As alluded to herein, scaling can be an issue in identifying point size for bitmapped text. GCNs are known to be able to cope with data in which scale can change frequently.

With a system trained as just described, bitmapped text may be input to the system and processed to output a normalized point size $S_N$. In embodiments, process flow may proceed as follows.

Figure 2:
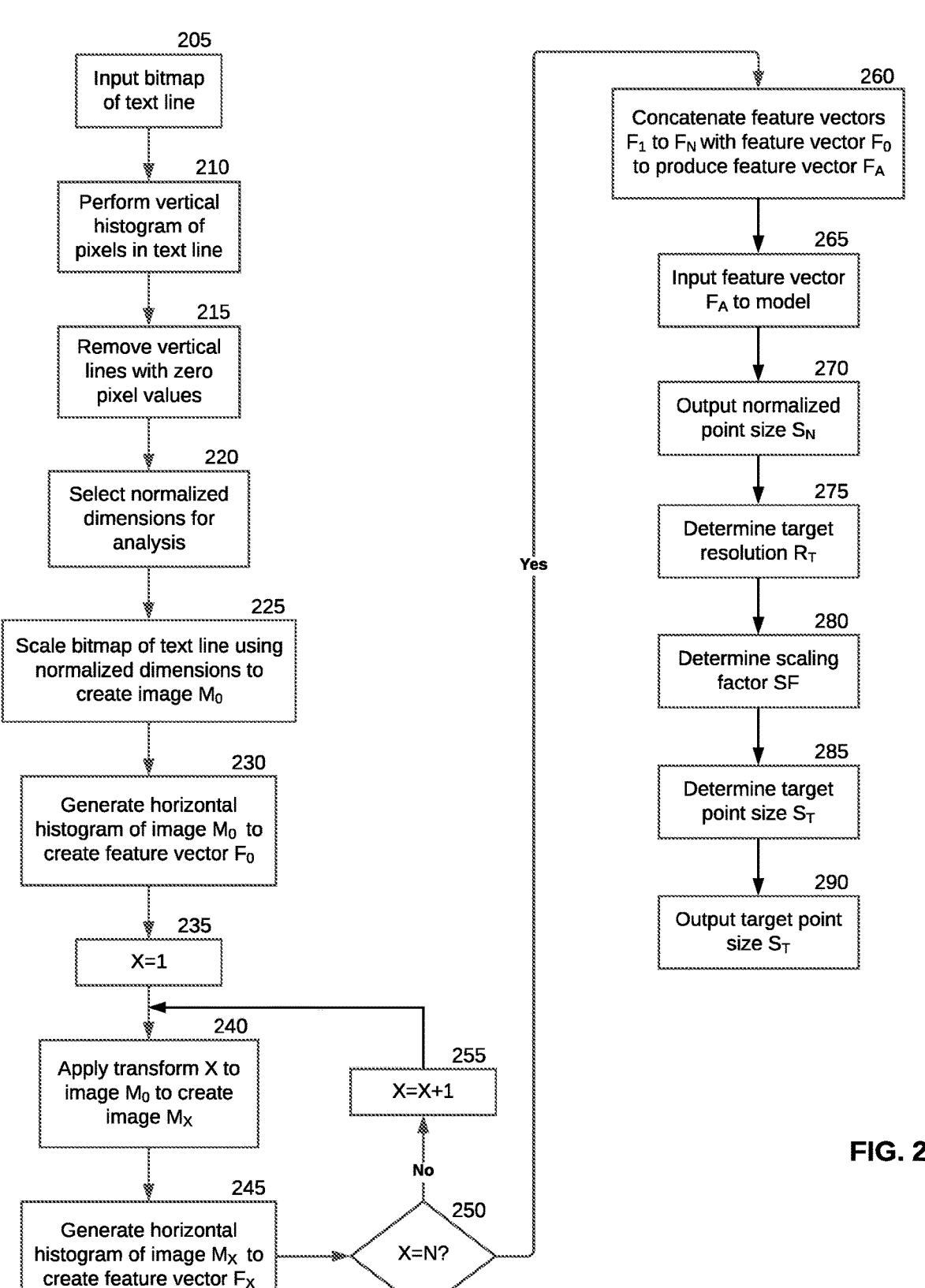
FIG. 2 is a high level diagram of process flow according to an embodiment.

Referring to FIG. 2, at 205 a bitmap of a line of text may be input into the system. Ordinarily skilled artisans will appreciate that this bitmapped text may be the result of different kinds of image processing and/or image analysis. In an embodiment, it may be assumed that the bitmapped text has a uniform point size. Text lines may have different lengths for different reasons, such as spaces between characters or words, numbers of characters or words, or the like. As one step in point size determination, at 210 a vertical histogram plot of pixels in a text line may be taken. Lower case and upper case characters, characters with ascenders, characters with descenders, characters with different accents and/or diacritical marks or punctuation, and the like may have different numbers of pixels in a given vertical line. Some vertical lines may be blank. In an embodiment, at 215 these blank vertical lines (whitespaces) may be removed, enabling more general operation of the model, and also making it possible to obtain the same results irrespective of presence of text spaces. There are instances in which different characters in different alphabets (for example, Chinese-Japanese-Korean, or CJK alphabet) may have different sizes of spaces between characters. In an embodiment, scaling also reduces an impact of shorter text segments as compared with longer text segments. This impact may be understood as treating characters in short segments as though they were repeated characters in longer segments.

At 220, normalized dimensions for text width and height (e.g. $W_N$, $H_N$) may be selected for text line analysis. The particular values are not critical to implementation of the invention. Merely by way of example, values for $W_N$ and $H_N$ may be in powers of 2, with $W_N$ being in turn a multiple of $H_N$. For example, $W_N$ could be 256 or 512, and $H_N$ could be 32 or 64. Other values, and other numerical relationships between $W_N$ and $H_N$ may be possible, depending on the embodiment.

At 225, after selection of normalized text width and height dimensions, scaling of the bitmap, perhaps modified as discussed with respect to earlier-described actions, to dimensions such as $W_N \times H_N$ may be effected, to create a bitmapped image $M_0$. At 230, this bitmapped image $M_0$ in turn may have a horizontal histogram generated for it, to create a feature vector $F_0$. At 235-255, a loop may be provided in which, in different loop iterations, different transforms may be applied to feature vector $F_0$ to create different images M, for which in turn respective horizontal histograms may be generated to create different feature vectors F. In 235-255, there are N such transforms which may be applied, so that there may be N iterations of the loop, resulting in creation of different images $M_1$-$M_N$, and different generated horizontal histograms and resulting feature vectors $F_1$-$F_N$.

In an embodiment, the transforms may include Gabor filters or other types of bandpass filters to process bidimensional signals such as bitmaps. Ordinarily skilled artisans will appreciate that Gabor filters are special types of short-time Fourier transforms. In an embodiment, a feature vector may be generated by convolving a bitmapped image with a Gabor filter. Ordinarily skilled artisans also will appreciate that Gabor filters have a number of parameters, variations of which yield different filters, and hence different transforms which may form some or all of the N transforms discussed with respect to 235-255 in FIG. 2.

An example of a Gabor filter is as follows:

$$\text{Complex: } g(x, y; \lambda, \theta, \psi, \sigma, \gamma) = \exp\left(-\frac{x'^2 + \gamma^2 y'^2}{2\sigma^2}\right) \exp\left(i\left(2\pi\frac{x'}{\lambda} + \psi\right)\right)$$

$$\text{Real: } g(x, y; \lambda, \theta, \psi, \sigma, \gamma) = \exp\left(-\frac{x'^2 + \gamma^2 y'^2}{2\sigma^2}\right) \cos\left(i\left(2\pi\frac{x'}{\lambda} + \psi\right)\right)$$

$$\text{Imaginary: } g(x, y; \lambda, \theta, \psi, \sigma, \gamma) = \exp\left(-\frac{x'^2 + \gamma^2 y'^2}{2\sigma^2}\right) \sin\left(i\left(2\pi\frac{x'}{\lambda} + \psi\right)\right)$$

where $x' = x \cos\theta + y \sin\theta$ and $y' = -x \sin\theta + y \cos\theta$ and where the following parameters control the shape and size of the Gabor function:

$\lambda$=wavelength of the sinusoidal component;

$\theta$=orientation of the normal to the parallel stripes of the Gabor function;

$\psi$=phase offset of the sinusoidal function;

$\sigma$=sigma/standard deviation of the Gaussian envelope;

$\gamma$=spatial aspect ratio and specifies the ellipticity of the support of the Gabor function.

Varying one or more of these parameters will yield different values of the Gabor function, and therefore different transforms.

In embodiments, the Gabor filter(s) and other transforms usefully may be employed in a neural network such as a convolutional neural network (CNN).

After all of the feature vectors have been generated, at 260 all of the feature vectors $F_0$-$F_N$ may be concatenated (linked together) to produce a feature vector $F_A$. At 265, this feature vector $F_A$ may be input to the model, so that at 270, a normalized point size $S_N$ may be output.

At 275, it being noted that the model was trained to have a resolution $R_G$ (ground truth resolution), a target resolution $R_T$ for the bitmapped text may be calculated, based on dimensions of the target document as was mentioned earlier, and also on the pixel dimensions of the input image. The resolution $R_T$ may be different for different document dimensions, such as letter size, legal size, tabloid size, A4 size, and the like. The resolution $R_T$ also may be different for different document margins, and/or for different combinations of document dimensions and document margins. At 280, from the target resolution $R_T$, a scale factor $S_F$ may be calculated. In an embodiment, a ratio of text line bounding box height $H_0$ to normalized height $H_N$ may determine the scale factor $S_F$.

At 285, then, using the scale factor $S_F$, in an embodiment a target point size $S_T$ may be computed using the normalized point size $S_N$ and a ratio of the resolution $R_G$ of the model to the target resolution $R_T$, as follows:

$$S_T = \frac{S_N * \left(\frac{R_G}{R_T}\right)}{SF}$$

In an embodiment, this target point size $S_T$ may be used in the electronic document. Depending on the electronic document and on the margins in the electronic document, the target point size may be rounded up or down, to a whole point size or to a partial point size. The rounding may be appropriate or necessary because of point size deviations resulting from scaling operations performed both in training and in inference. In an embodiment, such rounding may help to keep the output in the electronic document more consistent.

Finally, at 290, after computing the target point size $S_T$, that target point size may be output, and may be used in the electronic document or documents.

Figure 3:
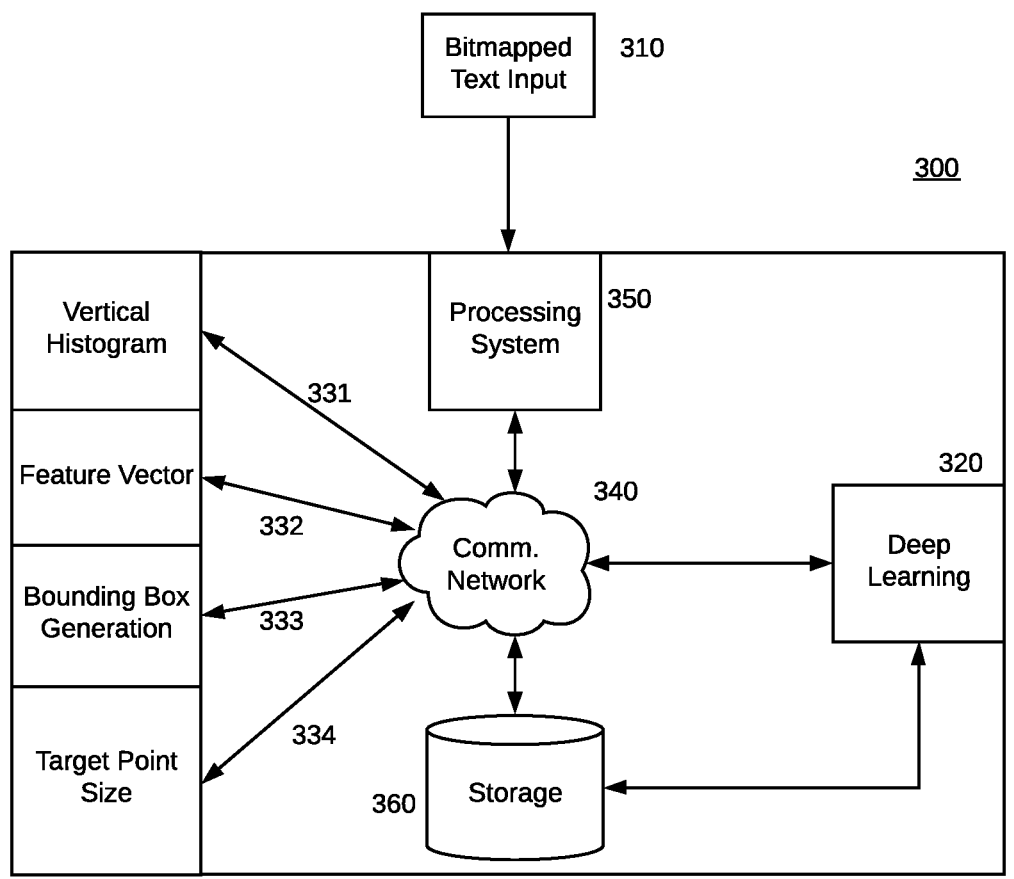
FIG. 3 is a high level block diagram according to an embodiment.

FIG. 3 is a high level block diagram of a computing system 300 which may implement a deep learning system 320, trained on known data to provide font point size based on a ground truth resolution $R_G$, among other things. Depending on the embodiment, bitmapped text input 310 may comprise a library of bitmapped text strings of different known lengths and different known characteristics. In an embodiment, bitmapped text input 310 may come from any number of sources, including not only "live" sources such as scanners, cameras, or other imaging equipment which can provide bitmapped images of known text sequences, but also "canned" sources such as libraries.

Processing system 350 may be a separate system, or it may be part of bitmapped text input 310, or may be part of deep learning system 320, depending on the embodiment. Processing system 350 may include one or more processors, one or more storage devices, and one or more solid-state memory systems (which are different from the storage devices, and which may include both non-transitory and transitory memory).

Depending on the embodiment, processing system 350 may include deep learning system 320 or may work with deep learning system 320 In other embodiments, any one or more of blocks 331-334 may implement its own deep learning system 320. In embodiments, each of the blocks 331-334 may include one or more processors, one or more storage devices, and one or more solid-state memory systems (which are different from the storage devices, and which may include both non-transitory and transitory memory). In embodiments, additional storage 360 may be accessible to one or more of text height determination block 331 or bounding box generation block 332 and processing system 350 over a communications network 340, which may be a wired or a wireless network or, in an embodiment, the cloud.

In an embodiment, storage 360 may contain training data for the one or more deep learning systems in one or more of blocks 320, 331-334, or 350. Storage 360 may store bitmapped text from input 310.

Where communications network 340 is a cloud system for communication, one or more portions of computing system 300 may be remote from other portions. In an embodiment, even where the various elements are co-located, network 340 may be cloud-based.

FIG. 4 is a high level diagram of apparatus for weighting of nodes in a deep learning system according to an embodiment. As training of a deep learning system proceeds according to an embodiment, the various node layers 420-1, . . . ,

420-N may communicate with node weighting module 410, which calculates weights for the various nodes, and with database 450, which stores weights and data. As node weighting module 410 calculates updated weights, these may be stored in database 450.

FIG. 5 is a high level diagram of apparatus to operate a deep learning system according to an embodiment. In FIG. 5, one or more CPUs 510 may communicate with CPU memory 520 and non-volatile storage 550. One or more GPUs 530 may communicate with GPU memory 540 and non-volatile storage 550. Generally speaking, a CPU may be understood to have a certain number of cores, each with a certain capability and capacity. A GPU may be understood to have a larger number of cores, in many cases a substantially larger number of cores than a CPU. In an embodiment, each of the GPU cores may have a lower capability and capacity than that of the CPU cores, but may perform specialized functions in the deep learning system, enabling the system to operate more quickly than if CPU cores were being used.

Depending on the embodiment, one or more of deep learning system 320, vertical histogram generation block 331, feature vector generation block 332, or bounding box generation block 333, or target point size generation block 334, or processing system 350 may employ some or all of the apparatus shown in FIG. 5.

While the foregoing describes embodiments according to aspects of the invention, the invention is not to be considered as limited to those embodiments or aspects. Ordinarily skilled artisans will appreciate variants of the invention within the scope and spirit of the appended claims.

What is claimed is:

1. A method comprising:
   a) responsive to receipt of a bitmap of a text line, performing a vertical histogram of pixels in the text line;
   b) scaling the bitmap of the text line to create an image;
   c) generating a horizontal histogram of the image to create an original feature vector;
   d) applying a transform to the image to create a further image;
   e) generating a horizontal histogram of the further image to create a further feature vector;
   f) concatenating the original feature vector with the further feature vector to create an output feature vector which is input to a deep learning model;
   g) applying the output feature vector to obtain a normalized point size;
   h) responsive to document parameters, determining a target resolution;
   i) responsive to h), determining a scaling factor; and
   j) responsive to i), determining a target point size.

2. The method of claim 1, further comprising removing, from the vertical histogram, lines with zero pixel values.

3. The method of claim 1, further comprising repeating d) and e) to generate a plurality of further feature vectors, and wherein f) comprises concatenating all of the further feature vectors with the original feature vector to create the output feature vector.

4. The method of claim 1, wherein the target point size is calculated as follows:

$$S_T = \frac{S_N * \left(\frac{R_G}{R_T}\right)}{SF}$$

where $S_T$ is the target point size;

$S_N$ is the normalized point size;

$R_G$ is a ground truth resolution;

$R_T$ is the target resolution; and

SF is the scale factor.

5. The method of claim 1, wherein the transform comprises a Gabor filter.

6. The method of claim 3, wherein repeating d) comprises applying a plurality of Gabor filters to generate the plurality of further feature vectors.

7. The method of claim 1, wherein the deep learning model comprises a model selected from the group consisting of convolutional neural networks (CNN), deep convolutional neural networks (DCNN), and Gabor Convolutional Networks (GCN).

8. The method of claim 1, further comprising training the deep learning model using bitmap text of known point size.

9. The method of claim 8, further comprising rendering the bitmap text at a ground truth resolution and scaling the bitmap text to a target scale height.

10. The method of claim 9, further comprising scaling a known point size of the bitmap text based on a ratio of a height of a bounding box for a line of the bitmap text to the target scale height.

11. An apparatus comprising at least one processor and at least one non-transitory memory storing instructions which, when executed by the at least one processor, perform a method comprising:

a) responsive to receipt of a bitmap of a text line, performing a vertical histogram of pixels in the text line;

b) scaling the bitmap of the text line to create an image;

c) generating a horizontal histogram of the image to create an original feature vector;

d) applying a transform to the image to create a further image;

e) generating a horizontal histogram of the further image to create a further feature vector;

f) concatenating the original feature vector with the further feature vector to create an output feature vector which is input to a deep learning model;

g) applying the output feature vector to obtain a normalized point size;

h) responsive to document parameters, determining a target resolution;

i) responsive to h), determining a scaling factor; and j) responsive to i), determining a target point size.

12. The apparatus of claim 11, wherein the method further comprises removing from the vertical histogram, lines with zero pixel values.

13. The apparatus of claim 11, wherein the method further comprises repeating d) and e) to generate a plurality of further feature vectors, and wherein f) comprises concatenating all of the further feature vectors with the original feature vector to create the output feature vector.

14. The apparatus of claim 11, wherein the target point size is calculated as follows:

$$S_T = \frac{S_N * \left(\frac{R_G}{R_T}\right)}{SF}$$

where $S_T$ is the target point size;

$S_N$ is the normalized point size;

$R_G$ is a ground truth resolution;

$R_T$ is the target resolution; and

SF is the scale factor.

15. The apparatus of claim 11, wherein the transform comprises a Gabor filter.

16. The apparatus of claim 11, wherein repeating d) comprises applying a plurality of Gabor filters to generate the plurality of further feature vectors.

17. The apparatus of claim 11, wherein the deep learning model comprises a model selected from the group consisting of convolutional neural networks (CNN), deep convolutional neural networks (DCNN), and Gabor Convolutional Networks (GCN).

18. The apparatus of claim 11, wherein the method further comprises training the deep learning model using bitmap text of known point size.

19. The apparatus of claim 18, wherein the method further comprises rendering the bitmap text at a ground truth resolution and scaling the bitmap text to a target scale height.

20. The apparatus of claim 19, wherein the method further comprises scaling a known point size of the bitmap text based on a ratio of a height of a bounding box for a line of the bitmap text to the target scale height.

* * * * *